Sept. 1, 1964 W. H. DONNELLY ETAL 3,146,792
BALL VALVE
Filed Dec. 11, 1963 2 Sheets-Sheet 1

William H. Donnelly
Edward V. McMullin,
INVENTORS.

BY Koenig, Pope, Sennigar & Powers
attorneys.

Sept. 1, 1964 W. H. DONNELLY ETAL 3,146,792
BALL VALVE
Filed Dec. 11, 1963 2 Sheets-Sheet 2

United States Patent Office 3,146,792
Patented Sept. 1, 1964

3,146,792
BALL VALVE
William H. Donnelly, 7252 Stanford, University City, Mo., and Edward V. McMullin, 706 Forder Road, Mehlville, Mo.
Filed Dec. 11, 1963, Ser. No. 331,081
5 Claims. (Cl. 137—614.17)

This invention relates to valves, and more particularly to ball valves.

This application is a continuation-in-part of our copending application Serial No. 116,110, filed June 9, 1961, now abandoned, entitled Ball Valve.

It will be understood that a ball valve conventionally comprises a tubular valve body containing a ball confined between and sealing against a pair of packing rings in the body. The ball has a diametrical hole therethrough, and is adapted to be rotated by means of a shaft extending out of the body between an open position wherein the hole is aligned with the body for flow through the valve and a closed position wherein the hole is at right angles to the body and the ball consequently blocks flow through the body. In such a valve, access to the hole in the ball can be attained only through one end or the other of the valve body. Consequently, when such a valve is connected in a pipe line, for example, with a pipe connected to the inlet end of the valve body and a pipe connected to the outlet end of the valve body, the hole is inaccessible unless a cut-off valve is provided to cut off flow through the valve (and in some instances a cut-off valve downstream from the valve to cut off back flow) to make it possible to disconnect the valve from the pipes.

Accordingly, the object of this invention, in general, is the provision of an improved ball valve construction in which provision is made for obtaining access to the hole in the ball without disconnection of the valve from the line and without any necessity for any additional cut-off valve or valves in the line. Essentially, this is accomplished by providing a lateral opening in the valve body so positioned as to be closed by the ball when the ball is in its position for flow through the valve body and to register with the hole in the ball when the ball is turned to its position for blocking flow through the valve body, whereupon access may be had to the hole through the lateral opening.

The valve construction of this invention is adapted for such uses as insertion of a go-devil of a type sometimes referred to as a "pig" for line-cleaning purposes. In such case, the ball may be provided with means for catching a pig after it has passed through the line, after which the ball may be turned to remove the pig. The valve construction of this invention is also adapted for use with inserts of various types in the hole with such inserts readily accessible by turning the ball to align the hole in the ball with the lateral opening and concomitantly blocking flow through the valve. Examples of such inserts are strainers and orifice fittings, to which access may be obtained for cleaning and/or replacement, and excess flow valve assemblies, to which access may be obtained for removal and replacement. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a view in side elevation of a ball valve of this invention;

Corresponding reference characters indicate corresponding parts throughout the several views of the drawings.

Figure 1:
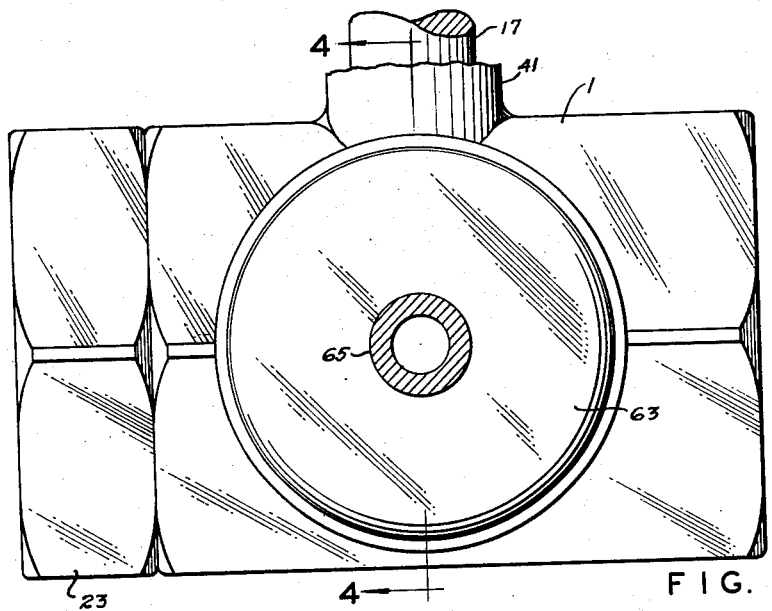

Referring to FIGS. 1–4 of the drawings, a ball valve of this invention is shown to comprise a tubular valve body 1 containing a valve ball 3 confined between and sealing against a pair of packing rings 5 and 7 in the body. The ball has a diametrical hole 9 therethrough. The body has a lateral tubular extension 11 defining a lateral opening 13 in communication with ball chamber 15 in the valve body. As will be noted in the drawings, the inside diameter of the extension 11 and the length of the extension are at least as great as the diameter of the hole 9. The ball is adapted to be rotated by means of a shaft 17 extending out of the valve body on an axis at right angles to the diametrical hole in the valve body and at right angles to the axis of extension 11 between the position shown in FIG. 2 for flow through the body (from left to right as viewed in FIG. 2) and the position shown in FIG. 4 for blocking flow through the valve body. As will be made apparent hereinafter, tubular extension 11 provides a pressure chamber for trapping fluid when the ball is rotated between the positions shown in FIGS. 2 and 4. In the latter position, hole 9 is accessible through the lateral opening 13 defined by lateral extension 11.

Figure 2:
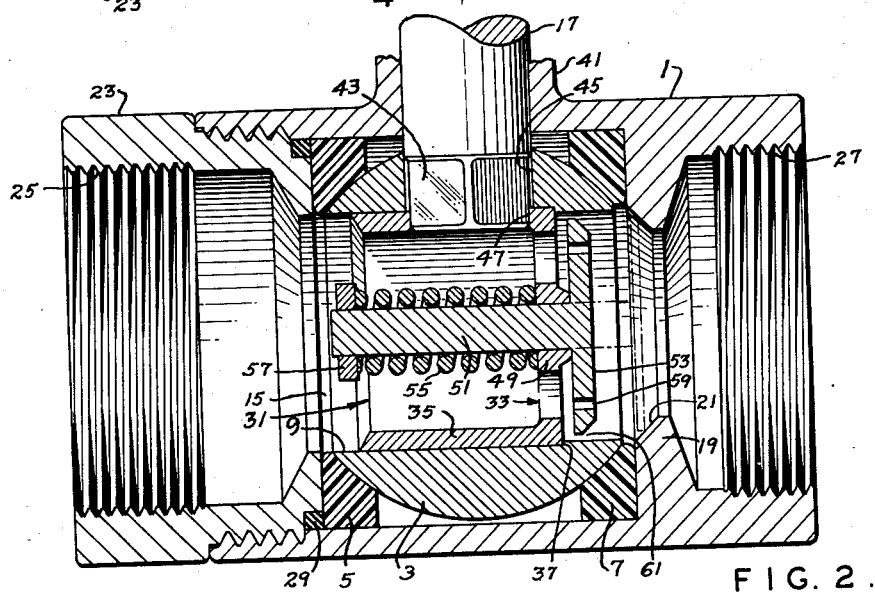
FIG. 2 is a longitudinal section through the valve taken on line 2—2 of FIG. 3 showing an excess flow valve assembly in the hole in the ball and showing the ball in its position for flow through the valve.

More particularly, the valve body 1 has a bore extending inward from its left end as viewed in FIG. 2 (which is its inlet end) which provides the ball chamber 15. At the inner end of this bore or chamber 15 is an annular shoulder 19, the inner periphery of which is bevelled as indicated at 21 to form an excess flow valve seat. Packing ring 7 engages shoulder 19 and is engaged by one end of the ball. Packing ring 5 is inserted in bore 15 to seat against the other end of the ball, and a gland 23 is threaded in the inlet end of bore 15 to hold the rings and ball in the bore and to compress the rings for sealing tightly against the ball while permitting the ball to rotate on its vertical axis as shown in FIG. 2. The gland is shown as internally threaded at 25 for connection of an inlet pipe, and the other end of body 1 is shown as internally threaded at 27 for connection of an outlet pipe. Additional packing is indicated at 29 around the inner end of the gland.

Figure 4:
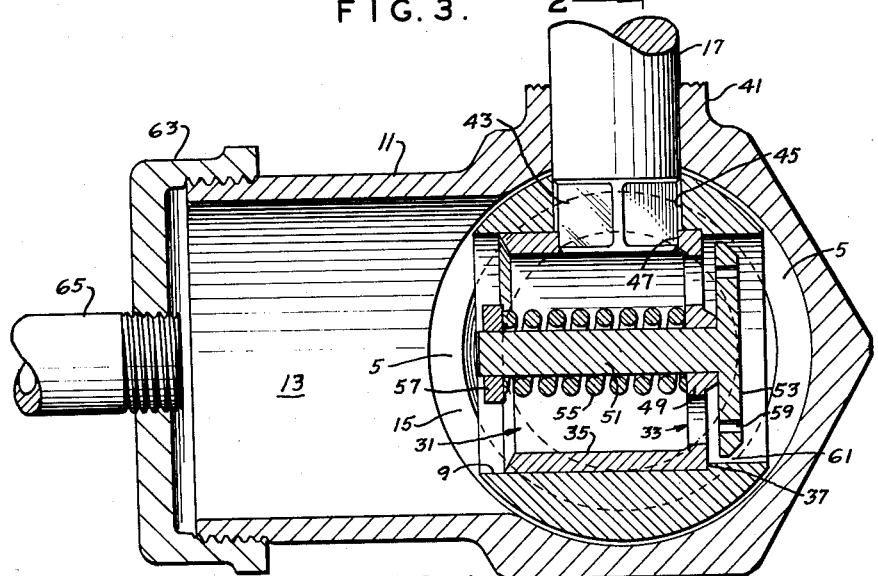
FIG. 4 is a transverse section taken on line 4—4 of FIG. 1 showing the ball turned to block flow through the valve.

As shown in FIGS. 2 and 4, an excess flow valve assembly generally designated 31 is inserted in the hole 9 in the ball. This assembly includes a valve guide comprising a spider 33 having a cylindrical rim 35 removably fitted in the hole in the ball with the spider abutting an annular shoulder 37 adjacent one end of the hole. Shaft 17 extends through a boss 41 on the valve body 1. The shaft has a key 43 at its inner end removably received in a cylindrical hole 45 in the ball and a slot 47 in the cylindrical rim 35. This holds the guide 33, 35 in the hole in the ball. The shaft 17 passes freely through cylindrical hole 45 in ball 3 and is not keyed to the ball. Accordingly, rotation of the shaft when the assembly 31 is not in the hole 9 will not rotate the ball 3. When the assembly 31 is located in the hole 9 and the key 43 on shaft 17 is in the slot 47, rotation of the shaft causes the insert, and consequently the ball, to rotate. Thus, a workman cannot inadvertently turn the ball from its blocking position to its flow-through position when the insert is not in hole 9. By removing the shaft, guide 33, 35 is released for withdrawal from the ball from the left end of the hole as viewed in FIG. 4. Spider 33 has a central hub 49 in which is axially slidable an excess flow valve stem 51 having an excess flow valve head 53 on its outer end adapted for engagement with the excess flow valve seat 21. A coil compression spring 55 surrounding the stem reacts from the inside of spider 33 against a collar 57 on the stem to tend to retract the valve head 53. The latter is shown as having bleed holes 59 therein. As shown, shoulder 37 is spaced from the adjacent end of the hole in the ball a distance somewhat greater than the thickness of the head 53 to provide a space 61 into which head 53 may be fully retracted to permit the ball to turn.

The lateral extension 11 from the valve body 1 is shown as having a cap 63 threaded thereon and a pipe 65 extending from the cap. This pipe 65 may have a relief or bleeder valve (not shown) connected therewith for a purpose to be explained.

With the valve shown in FIGS. 1–4 connected in a pipe line, and with the left end of the valve as shown in FIG. 2 the upstream end and the right end the downstream end, flow through the valve is obtained under normal conditions with the ball 3 turned to its FIG. 2 position. Spring 55 holds the excess flow valve head 53 retracted within space 61. Flow occurs through the holes in the spider 33 and out around the periphery of head 53. In the event of excess flow, as for example in case of a leak downstream from the valve with resultant decrease in downstream pressure, the excess pressure on head 53 causes it to close against seat 21 against the bias of spring 55.

Bleed holes 59 provide for pressure relief to enable spring 55 to retract head 53 when the excess flow condition has been corrected. With head 53 retracted in space 61, the ball may be turned to the FIG. 4 position blocking flow through the valve body 1. In this position, the hole 9 in the ball registers with lateral opening 13 defined by lateral extension 11. Fluid under pressure then trapped in the hole in the ball and the pressure chamber in extension 11 may be bled off through pipe 65 and the bleeder valve (not shown) connected therewith. Then cap 63 may be removed for access to the hole in the ball and the excess flow valve assembly 31. The latter may then be removed and replaced as a unit as is sometimes necessary due to fatigue and weakening of the spring 55, by removing shaft 17 and sliding the assembly as a unit out of the hole in the ball, then inserting a new assembly and replacing the shaft 17. Bleeding off of trapped fluid prior to removing cap 65 is desirable to avoid dangerous blowing off of trapped fluid if cap 65 were to be removed without such bleed-off (or if there were no such cap and bleed-off arrangement).

Figure 5:
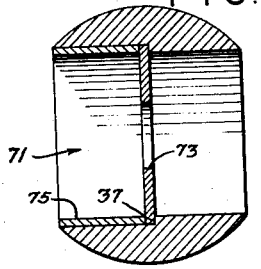
FIG. 5 is a detail section of a ball per se having an orifice fitting therein.

FIG. 5 shows a modified ball structure having an orifice fitting 71 therein. Fitting 71 comprises a disc having an orifice 73 therein. The disc is held against a shoulder 37 in the ball by a cylindrical retainer 75 fitted in the hole in the ball. The orifice fitting can be removed in a manner similar to the excess flow valve assembly and replaced by another orifice fitting having a different size orifice.

Figure 6:
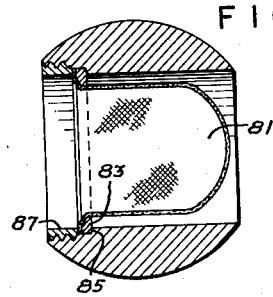
FIG. 6 is a detail section of a ball per se having a strainer therein.
Figure 3:
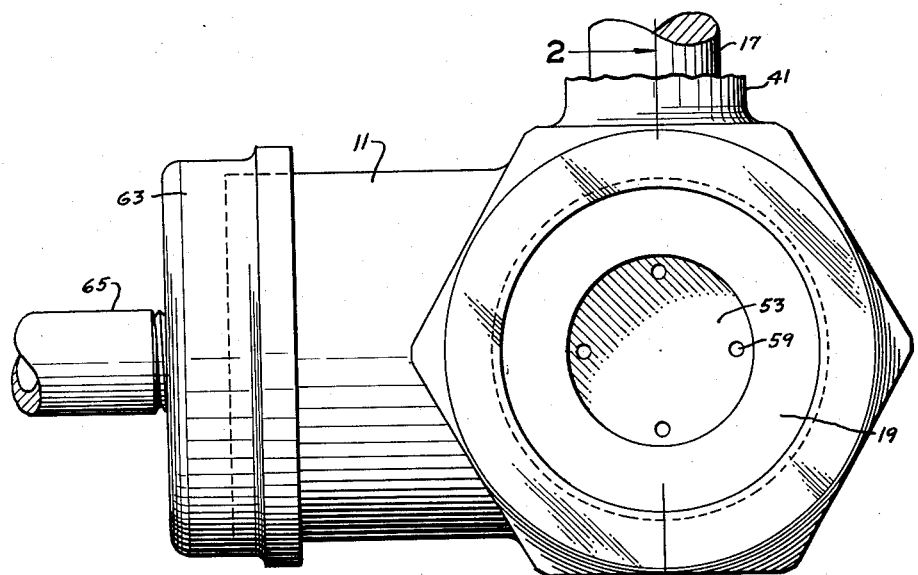
FIG. 3 is an end elevation of the valve.

FIG. 6 shows a third type of ball structure having a strainer 81 therein also adapted to be removed for cleaning, for example. The outer edge of the strainer is shown as sandwiched between a backup ring 83 seated against a shoulder 85 and a threaded clamping ring 87.

Figure 7:
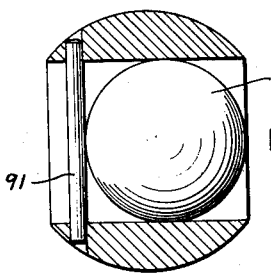
FIG. 7 is a longitudinal section of a ball per se having pig-catching bars therein.
Figure 8:
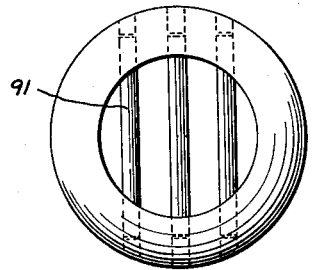
FIG. 8 is an end elevation of FIG. 7.

FIGS. 7 and 8 illustrate another type of ball structure for so-called pig catching and launching. FIG. 7 illustrates a spherical pig P such as may be forced through a pipe line for cleaning or drying purposes. For example, a pig P may be used to remove internal scale from the pipe. A pig may also be used internally to dry the pipe as when changing over from delivering a liquid petroleum product to delivering gas through the line. Under the latter circumstances, it is customary to flush out the line with water, then send a pig through the line to dry it to prevent freezeup.

As shown in FIGS. 7 and 8, the ball is provided with pig catching bars 91 extending across the hole in the ball adjacent one end of the hole. By rotating the ball to its flow-blocking position with bars 91 at the end of the hole in the ball away from extension 11 a pig P may be inserted in the ball, and then the ball may be turned to its flow-providing position with bars 91 at the upstream end of the hole to launch the pig. The bars may also be used to catch a pig coming downstream toward the valve by turning the ball to flow-providing position with bars 91 at the downstream end of the hole in the ball. Then, when the pig has been caught, the ball may be turned to its flow-blocking position with bars 91 at the end of the hole in the ball away from extension 11 for removal of the pig. For launching only, the bars would not be needed.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A valve comprising a tubular body having a lateral opening therein, a ball having a hole therethrough rotatable in the body between a first position in which the hole is aligned with the body for flow therethrough and a second position in which the hole is aligned with the lateral opening and the ball blocks flow through the body, a lateral tubular extension on said tubular body defining said lateral opening, a removable cap substantially closing the outer end of said extension to provide a pressure chamber within said extension, relief means associated with said pressure chamber for bleeding the latter and the hole in said ball when the ball is rotated from its first to its second position, an insert in the hole in the ball accessible through said lateral tubular extension when the ball is rotated to said second position, said insert having a passage therein adapted to alter the flow downstream of the insert relative to the flow upstream of the insert when the ball is in said first position, and a shaft extending through said tubular body and said ball and removably keyed in said insert whereby said ball rotates with said insert when the latter is rotated by said shaft.

2. A valve comprising a tubular body having a lateral opening therein, a ball having a hole therethrough rotatable in the body between a first position in which the hole is aligned with the body for flow therethrough and a second position in which the hole is aligned with the lateral opening and the ball blocks flow through the body, a lateral tubular extension on said tubular body defining said lateral opening, the length and inside diameter of said extension being at least as great as the diameter of said hole, a removable cap substantially closing the outer end of said extension to provide a pressure chamber within said extension, relief means associated with said pressure chamber for bleeding the latter and the hole in said ball when the ball is rotated from its first to its second position, an insert in the hole in the ball accessible through said lateral tubular extension when the ball is rotated to said second position, said insert having a passage therein adapted to alter the flow downstream of the insert relative to the flow upstream of the insert when the ball is in said first position, and a shaft extending through said tubular body and said ball and removably keyed in said insert whereby said ball rotates with said insert when the latter is rotated by said shaft.

3. A valve as set forth in claim 2 wherein said shaft has a key on its inner end and said insert has a slot receiving said key.

4. A valve comprising a tubular body having a lateral opening therein, a ball having a hole therethrough rotatable in the body between a first position in which the hole is aligned with the body for flow therethrough and a second position in which the hole is aligned with the lateral opening and the ball blocks flow through the body, removable means substantially closing said opening, means associated with said opening for bleeding the opening and the hole in said ball when the ball is rotated from its first to its second position, an insert in the hole in the ball accessible through the lateral opening when the ball is rotated to said second position, said insert having a passage therein adapted to alter the flow downstream of the insert relative to the flow upstream of the insert, said insert comprising an auxiliary valve structure received in said hole, said auxiliary valve structure comprising an excess flow valve assembly including a normally open valve member adapted to close in response to excess pressure differential upstream and downstream of said valve, said excess flow assembly comprising a guide received in said passage, said valve member having a stem slidable in the guide in axial direction relative to the hole in the ball and a head engageable with a seat in the valve, spring means for biasing said valve member in the direction away from the seat, a shaft extending through said body and said ball, said shaft having a key on its inner end, said insert having a slot receiving said key, said shaft being adapted to rotate said insert, and said ball rotating with said insert when the latter is rotated by said shaft.

5. A valve comprising a tubular body having a lateral opening therein, a ball having a hole therethrough rotatable in the body between a first position in which the hole is aligned with the body for flow therethrough and a second position in which the hole is aligned with the lateral opening and the ball blocks flow through the body, removable means substantially closing said opening, means associated with said opening for bleeding the opening and the hole in said ball when the ball is rotated from its first to its second position, an insert in the hole in the ball accessible through the lateral opening when the ball is rotated to said second position, said insert having a passage therein adapted to alter the flow downstream of the insert relative to the flow upstream of the insert, said insert comprising an auxiliary valve structure received in said hole, said auxiliary valve structure comprising excess flow valve assembly including a normally open valve member adapted to close in response to excess pressure differential upstream and downstream of said valve, said excess flow assembly comprising a guide received in said passage, said valve member having a stem slidable in the guide in axial direction relative to the hole in the ball and a head engageable with a seat in the valve, said seat being formed in said tubular valve body downstream from said ball, said guide comprising a spider receiving said stem and having a rim fitted in the hole in the ball, and said spider being spaced from one end of said passage to provide a chamber at said one end of the hole into which said head may be retracted to enable said ball to be rotated to said second position, a shaft extending through said body and said ball, said shaft having a key on its inner end, said rim having a slot receiving said key, said shaft being adapted to rotate said rim, and said ball rotating with said rim when the latter is rotated by said shaft.

References Cited in the file of this patent
UNITED STATES PATENTS

| | | |
|---|---|---|
| 314,216 | Barker | Mar. 24, 1885 |
| 449,181 | Schneider | Mar. 31, 1891 |
| 535,813 | Cooper et al. | Mar. 19, 1895 |
| 1,992,319 | Maggenti | Feb. 26, 1932 |
| 2,764,173 | Renner | Sept. 25, 1956 |
| 2,786,219 | Meyer | Mar. 26, 1957 |
| 2,855,177 | Freeman | Oct. 7, 1958 |
| 2,866,213 | McArthur | Dec. 30, 1958 |

FOREIGN PATENTS

| | | |
|---|---|---|
| 374,621 | Germany | Apr. 26, 1923 |